W. A. JOHNSTON, A. W. BROWNE & F. L. WALLACE.
ANESTHETIC ADMINISTERING APPARATUS.
APPLICATION FILED OCT. 17, 1913.
1,279,549.
Patented Sept. 24, 1918.
7 SHEETS—SHEET 3.
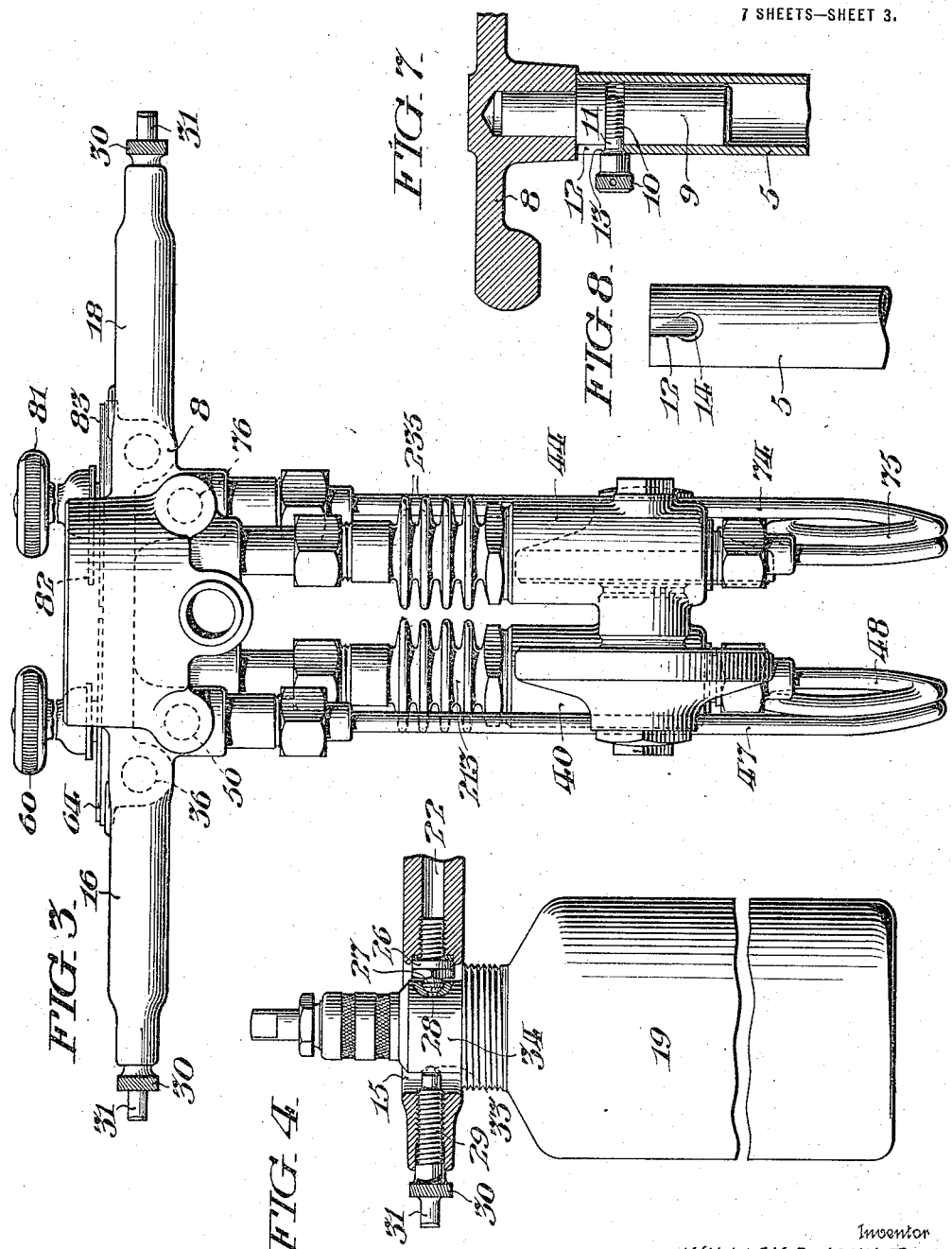
Inventor
WILLIAM A. JOHNSTON
ARTHUR W. BROWNE
FREDERICK L. WALLACE

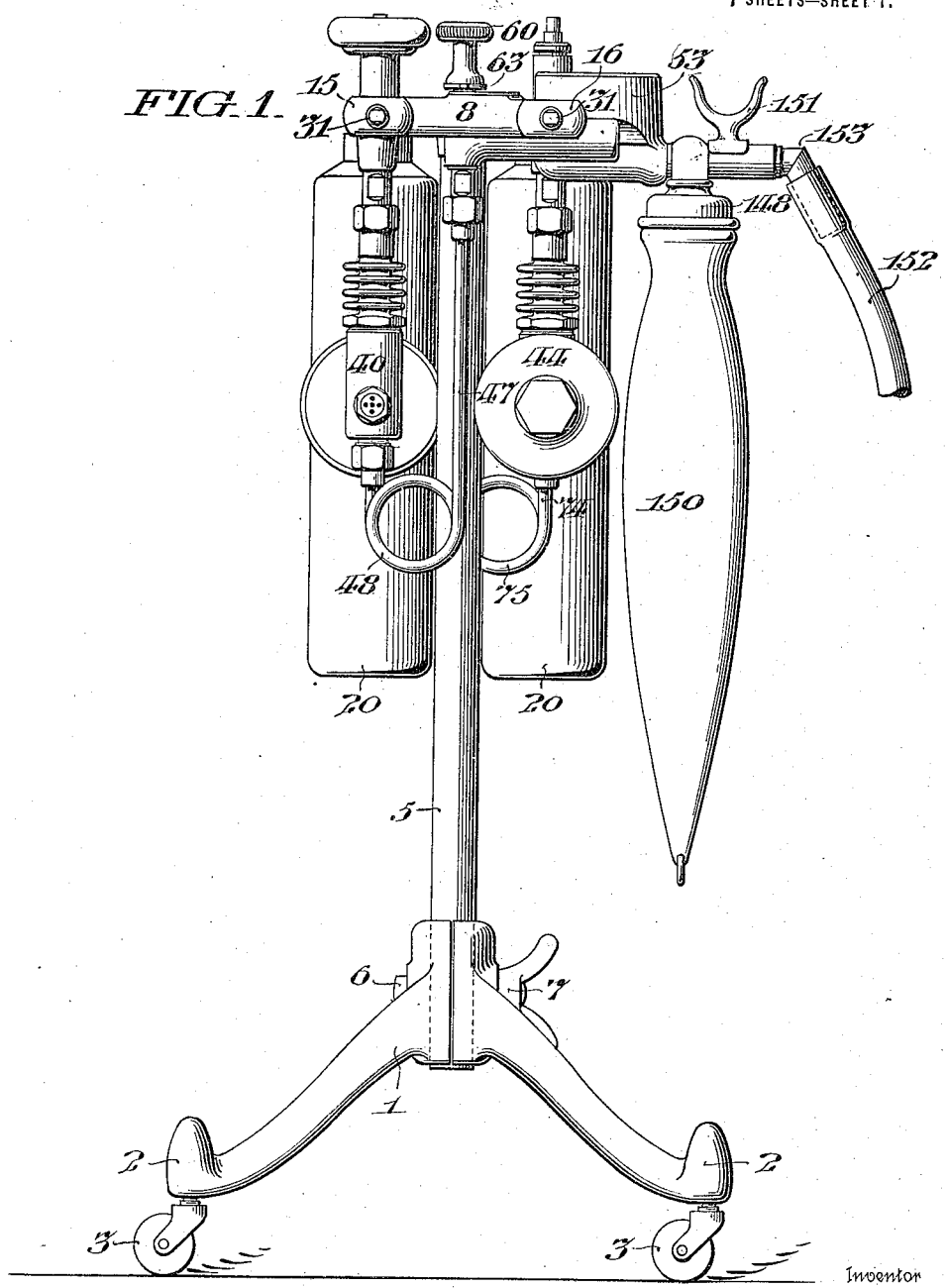

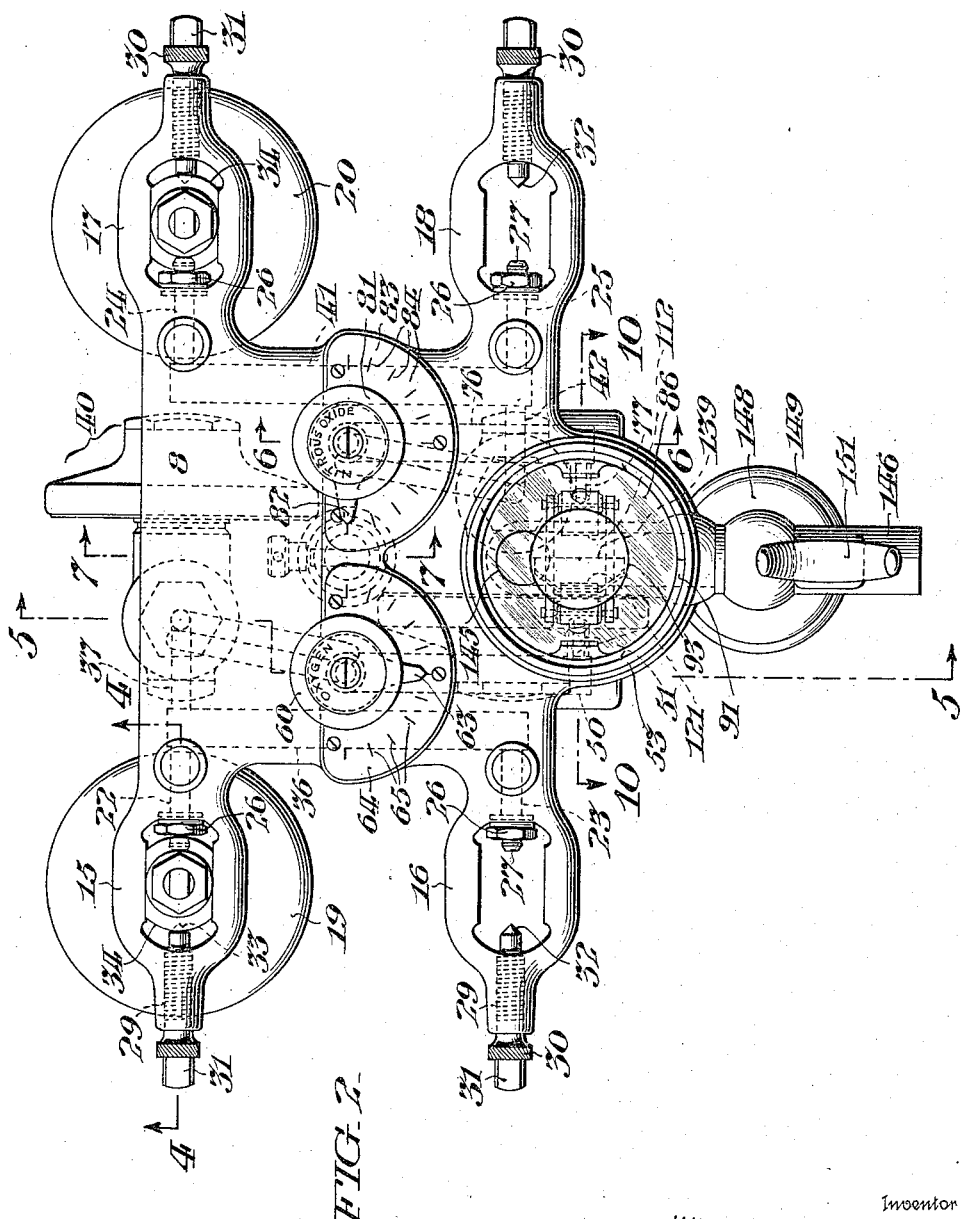

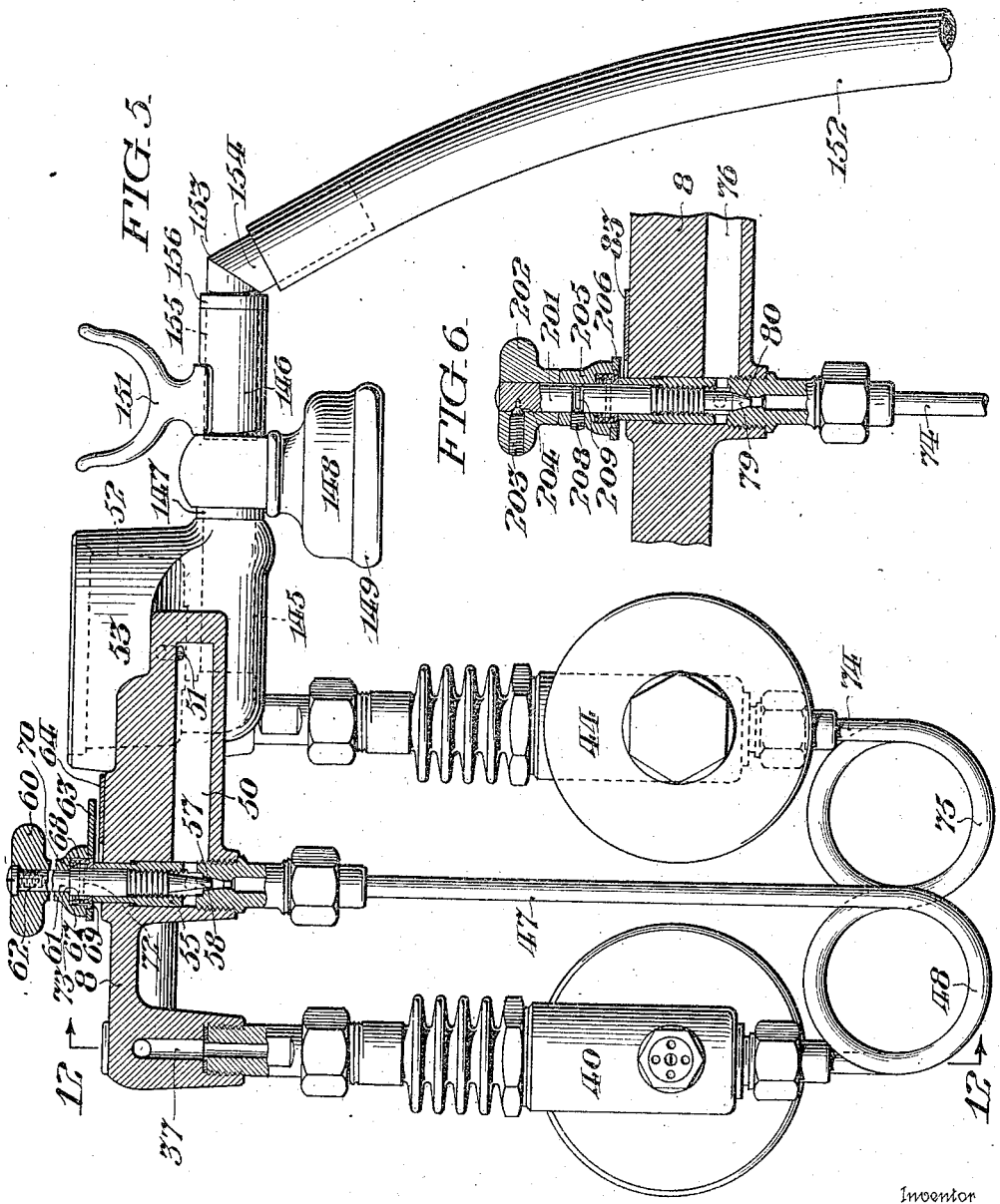

W. A. JOHNSTON, A. W. BROWNE & F. L. WALLACE.
ANESTHETIC ADMINISTERING APPARATUS.
APPLICATION FILED OCT. 17, 1913.
1,279,549.
Patented Sept. 24, 1918.
7 SHEETS—SHEET 5.
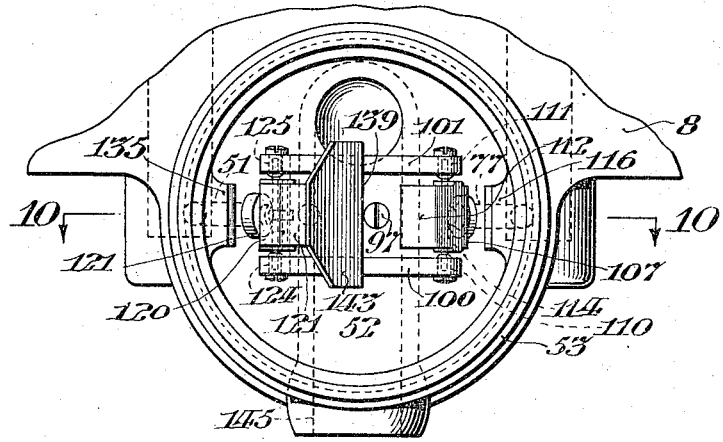
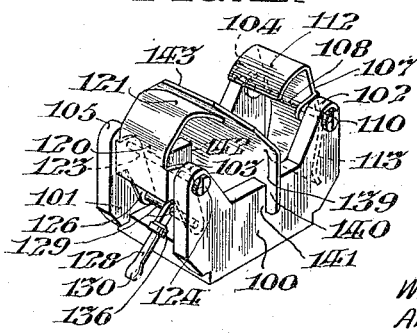

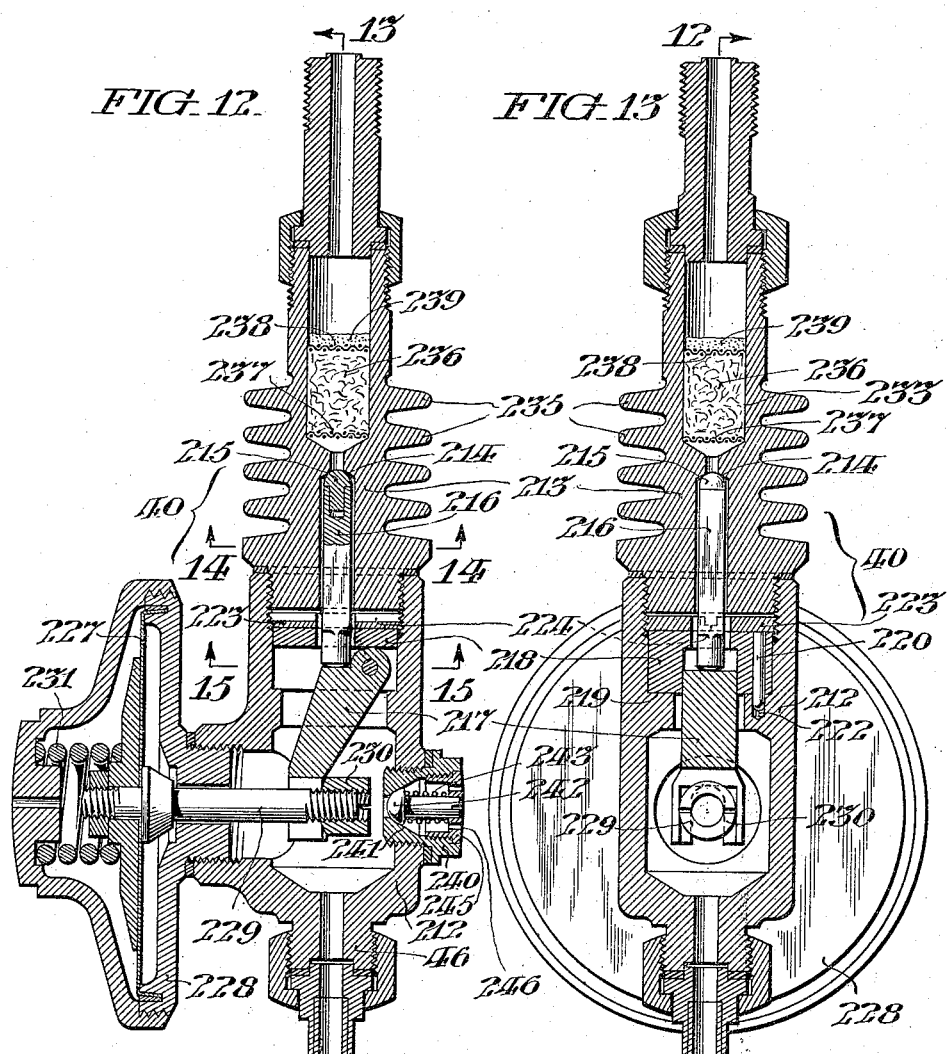

W. A. JOHNSTON, A. W. BROWNE & F. L. WALLACE.
ANESTHETIC ADMINISTERING APPARATUS.
APPLICATION FILED OCT. 17, 1913.
1,279,549.
Patented Sept. 24, 1918.
7 SHEETS—SHEET 7.
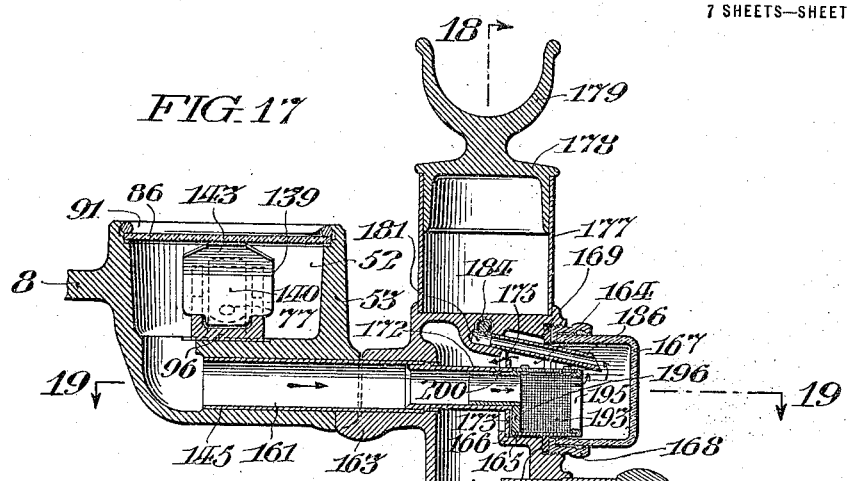
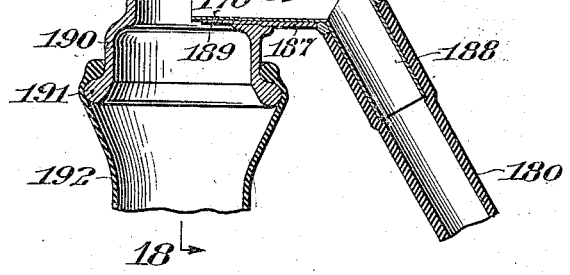
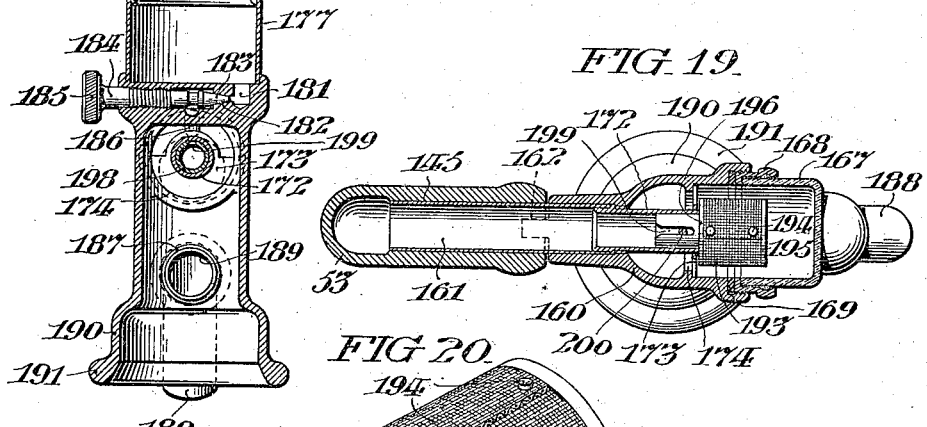
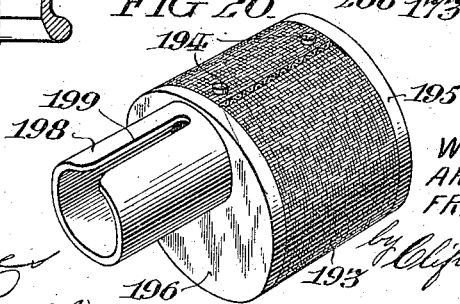
Inventor
WILLIAM A. JOHNSTON
ARTHUR W. BROWNE
FREDERICK L. WALLACE

UNITED STATES PATENT OFFICE.

WILLIAM A. JOHNSTON AND ARTHUR W. BROWNE, OF PRINCE BAY, NEW YORK, AND FREDERICK L. WALLACE, OF PHILADELPHIA, PENNSYLVANIA, ASSIGNORS TO THE S. S. WHITE DENTAL MANUFACTURING COMPANY, OF PHILADELPHIA, PENNSYLVANIA, A CORPORATION OF PENNSYLVANIA.

ANESTHETIC-ADMINISTERING APPARATUS.

1,279,549.     Specification of Letters Patent.     Patented Sept. 24, 1918.

Application filed October 17, 1913. Serial No. 795,699.

*To all whom it may concern:*

Be it known that we, WILLIAM A. JOHNSTON and ARTHUR W. BROWNE, citizens of the United States, residing at Prince Bay, county of Richmond, State of New York, and FREDERICK L. WALLACE, a citizen of the United States, residing at Philadelphia, county of Philadelphia, State of Pennsylvania, have invented certain new and useful Improvements in Anesthetic-Administering Apparatus, whereof the following is a specification, reference being had to the accompanying drawings.

This invention relates to that class of devices which are adapted to be employed by dentists, surgeons, physicians, and other anesthetists in producing and administering anesthetic mixtures in gaseous form.

The principal objects of this invention are, to provide a simple, efficient, and durable apparatus which may be readily controlled by the operator to produce an accurate mixture of different gases in predetermined proportions, and be varied as desired to form anesthetics for producing different degrees of anesthesia; to provide such apparatus with means to reduce the respective gases to a predetermined pressure without danger of freezing; and to provide means actuated by the respective gases to visually indicate to the operator that said gas is flowing, or to similarly indicate any cessation in such flow.

Other objects of this invention are, to provide such an apparatus with filtering means for arresting solid particles and moisture carried by the gases; to provide means for relieving any abnormal pressure in said apparatus; to provide controlling valves having means to effect an absolutely uniform increment of the volume of gas flowing therethrough in accordance with the rotation of said valve; and to provide said valves with means whereby a similar rotation of the respective valves permits a greater volume of gas to flow through one valve than through the other.

Further objects of this invention are, to provide an anesthetic administering apparatus with mechanism, readily controlled by the operator, to infuse ether or other volatile liquid anesthetic into the gas passing to the patient; and to provide said apparatus with an elastic gasometer in communication with the outlet passageway common to the different anesthetics.

This invention comprehends a divided base detachably connected to a supporting standard, and means for detachably connecting the head of the apparatus to said standard in rigid relation.

This invention also includes all of the various novel features of construction and arrangement hereinafter more definitely specified.

In the accompanying drawings, Figure 1 is a side elevational view of an anesthetic administering apparatus, conveniently embodying this invention, showing two nitrous oxid cylinders supported by the head of said apparatus;

Fig. 2 is a plan view of the head of the apparatus, showing an oxygen cylinder and a nitrous oxid cylinder engaged in operative position therein;

Fig. 3 is a front elevational view of the apparatus shown in Figs. 1 and 2, showing the head and the parts associated therewith, separated from the standard and having the cylinders and outlet tube removed;

Fig. 4 is a fragmentary sectional view, taken on the line 4—4 in Fig. 2, showing means for connecting the gas cylinders with the passageways in the head of the apparatus;

Fig. 5 is a vertical sectional view, partly in elevation, taken through the oxygen valve on the line 5—5 in Fig. 2;

Fig. 6 is a fragmentary sectional view taken through the nitrous oxid valve, on the line 6—6 in Fig. 2, but showing a modified form of hand-wheel;

Fig. 7 is a fragmentary sectional view, taken on the line 7—7 in Fig. 2, and showing the connection between the head of the apparatus and its supporting standard;

Fig. 8 is a side elevational view of the upper end of said standard;

Fig. 9 is an enlarged fragmentary plan view of the mixing chamber, with the closure removed for clearly showing the indicating mechanism therein;

Fig. 10 is a vertical transverse sectional view, taken through said mixing chamber, on the lines 10—10 in Figs. 2 and 9, the closure being shown in position;

Fig. 11 is a perspective view of the indicating mechanism, *per se;*

Fig. 12 is an enlarged vertical sectional view, taken axially through the pressure-reducing mechanism on the line 12—12 in Figs. 5 and 13;

Fig. 13 is a vertical sectional view, taken axially through the pressure-reducing mechanism on the line 13—13 in Fig. 12;

Fig. 14 is an inverted transverse sectional view taken on the line 14—14 in Fig. 12;

Fig. 15 is an inverted transverse sectional view taken on the line 15—15 in Fig. 12;

Fig. 16 is a face view of the safety valve shown in Fig. 12;

Fig. 17 is a vertical longitudinal sectional view, taken axially through the etherizing mechanism and mixing chamber;

Fig. 18 is a vertical transverse sectional view of said etherizing mechanism, taken on the line 18—18 in Fig. 17;

Fig. 19 is a plan sectional view of the mechanism shown in Figs. 17 and 18 on the line 19—19 in Fig. 17; and Fig. 20 is a perspective view of the reticulated volatilizing cylinder, *per se.*

In said figures, the base 1 is divided centrally and comprises four feet, 2, respectively provided with casters 3, the separable parts of said base 1 being joined together and clamped to the standard 5 by the bolt 6 and wing nut 7, as shown in Fig. 1.

The standard 5 conveniently supports the detachable head 8, which is provided with the depending stem 9 carrying the threaded thumb-screw 10, which has a reduced cylindrical portion 11 adapted to slide in the slot 12 in the upper end of the standard 5, and the adjoining conical portion 13 adapted to be seated in the countersink 14 at the inner end of the slot 12 in said standard by the rotation of said thumb-screw, whereby said stem may be rigidly engaged with said standard as a unitary structure, but readily disengaged therefrom.

As best shown in Fig. 2, the head 8 is provided with extensions forming yokes 15, 16, 17 and 18, arranged to receive and support the gas cylinders 19 and 20 containing oxygen and nitrous oxid, respectively. Said yokes 15, 16, 17 and 18 have gas passageways 22, 23, 24 and 25 respectively provided with check valves 26, against the nipples 27 of which the outlet orifices 28 of the respective cylinders are forced in gas-tight relation by the set-screws 29, which are provided with the knurled flange 30 and the flattened shank 31 for engagement with a suitable wrench or key, by which they may be rotated to engage their conical ends 32 with the recess 33 in the neck 34 of the cylinders 19 and 20, as best shown in Fig. 4.

The passageways 22 and 23 are connected by a common passageway 36 with a passageway 37 leading to the inlet of the pressure-reducer 40 for the oxygen gas, and the passageways 24 and 25 are connected by a common passageway 41 with a passageway 42 leading to the inlet of the pressure-reducer 44 for the nitrous oxid gas.

The outlet 46 of the pressure-reducer 40 is connected by the pipe 47, having the double loop 48, with the valve which controls the flow of gas from the oxygen cylinders through the passageway 50, which leads through the inlet branch 51 into the mixing chamber 52, whose casing 53 is preferably formed integral with the head 8.

The oxygen valve comprises the valve casing 55 extending vertically through the head 8, in threaded engagement therewith, and having a conical seat 57 against which the conical valve plug 58 is forced by reason of its threaded connection with the valve casing 55 when rotated by the hand-wheel 60, which is secured on the valve stem 61 by the set-screw 62. The hand-wheel 60 conveniently carries a pointer 63, which is arranged to sweep over the dial-plate 64, having suitable graduations 65 for indicating to the operator the volume of gas admitted to the mixing chamber by the valve when said hand-wheel 60 is rotated to open said valve.

In order to accurately determine the volume of gas admitted by rotation of the valve plug 58, it is essential that there shall be no lost motion in said valve, and, therefore, means have been provided for maintaining the upper surfaces of the threads of the valve plug 58 in contact with the lower surfaces of the threads of the valve casing 55. This is effected by a coiled spring 67 disposed within the recess 68 in the hand-wheel 60 and bearing upon the flange 69 of the sleeve 70, which is forced by said spring against the top of the valve casing 55, tending to force the valve plug 58 and its stem 61, upwardly, and to consequently maintain the above-mentioned surfaces of the threads in contact, whereby any rotation of the hand-wheel 60 uniformly withdraws the valve plug 58 from the valve seat 57 to afford communication between the pipe 47 and passageway 50.

The sleeve 70 is forced to rotate with the valve plug 58 by means of the pin 72, which extends transversely through said valve stem 61 with its ends projecting into diametrically opposite longitudinal slots 73 in the sleeve 70, whereby said sleeve is free to move axially on said valve stem.

The nitrous oxid gas is similarly admitted from the pressure-reducer 44 to the mixing chamber 52 through the pipe 74 having the double loop 75, and the passageway 76 and its branch 77, and is controlled by the nitrous oxid valve, best shown in Fig. 6, which is similar to the oxygen valve except that the valve plug 79 and its seat 80 are formed of a greater angle, for the purpose of admitting a relatively greater volume of nitrous oxid gas, by a similar rotation of its valve plug. The rotation of the valve plug 79 is effected by the hand-wheel 81, which carries the pointer 82 over the dial-plate 83, having graduations 84 similar to the graduations 65 on the dial-plate 64 for the oxygen valve.

As best shown in Fig. 10, the gas mixing chamber 52 is provided with a closure 86, preferably formed of glass or other transparent material, mounted upon a gasket 87 on the seat 88, and held in position thereon by the open spring ring 89, which is arranged to be sprung into the groove 90 of the casing 53 which provides the overhanging lip 91 having the undercut wall 92, coöperating with said ring to cause it to press against the margin of the closure 86 to form a gas-tight joint with the gasket 87. The transparent closure 86 is preferably provided with a central opaque region 93, forming what may be termed a sight spot, beneath which the signals of the indicating mechanism are normally disposed.

The indicating mechanism forms a structure which may be removed from the mixing chamber 52 as a unit, and comprises the frame 95 whose base 96 is secured to the floor of said chamber 52 by the screw 97, and is maintained in alinement with the inlet branches 51 and 77 by the projection 98 extending into the recess 99 in the floor of the chamber 52.

The frame 95 is provided with upwardly extending side walls 100 and 101, respectively, upon opposite sides of the axial plane of the inlet branches 51 and 77, the opposite ends of the wall 100 being provided with upwardly extending lugs 102 and 103, and the opposite ends of the wall 101 having upwardly extending lugs 104 and 105. The lugs 102 and 104 provide a pivotal support for the oscillatory indicating member 107, which is provided with the shaft 108 whose opposite ends form trunnions mounted in adjustable bearings 110 and 111, which are screw-threaded in the respective lugs 102 and 104 and provide slotted heads for adjustment by an ordinary screw-driver. Said indicating member 107 is provided at its upper end with an inturned laterally extending wing forming the signal 112, normally maintained beneath the opaque region 93 of the transparent closure 86 by the action of gravity, and having its lower portion 113 extending obliquely inward and overlying the nozzle 114 of the bushing 115, which is disposed in the end of the inlet branch 77 and through which the nitrous oxid gas is directed against said overying portion 113 to effect the oscillation of the indicating member 107 to the position shown in dot and dash lines in Fig. 10, and to hold said indicating member against the abutment 116 during the flow of nitrous oxid gas into the mixing chamber 52, so that the signal 112 is visible to the operator through the annular transparent portion of the closure 86. The extreme lower end of the indicating member 107 is preferably bent outwardly and serves to deflect the gas from its natural path as it is emitted from the nozzle 114, which causes it to be scattered through the chamber 52 to mix with the oxygen gas, which enters the mixing chamber, as hereinafter described.

The lugs 103 and 105 provide suitable pivotal supports for the indicating member 120, whose upper portion is deflected inwardly to provide the signal 121, normally disposed beneath the opaque region 93 of the transparent closure 86. Said indicating member 120 is mounted to oscillate upon the shaft 123, whose opposite ends form trunnions supported by suitable bearings 124 and 125, which are screw-threaded in the lugs 103 and 105 and provided with slotted heads for convenient adjustment with a screw-driver. The indicating member 120 is provided upon its opposite sides with inwardly depending arms 126 carrying a shaft 127 upon which is mounted the plunger 128, which is held in central position by spacing sleeves 129. The plunger 128 is loosely mounted on the shaft 127 and has its free end enlarged, as at 130, and extended into the bore of the bushing 131, which bore has a cylindrical portion 132 merging into a conical portion 133 tapering outwardly to the mouth of said bushing, so as to afford an increased flow of gas therethrough as the enlarged portion 130 of the plunger 128 is forced outwardly to oscillate the indicating member 120 to the position shown in dot and dash lines in Fig. 10, limited by the abutment 135. The normal position to which said indicating member 120 is shifted by gravity is determined by the flange 136 on the plunger 128 engaging the inner end of the bushing 131, as shown in full lines in Fig. 10.

It may be here noted that a considerably greater volume of the nitrous oxid gas is required for anesthetic purposes than the oxygen gas, and for this reason it has been found desirable to provide a more delicate mechanism for indicating the flow of the oxygen gas than is necessary in indicating the flow of the nitrous oxid gas, and, therefore, it will be obvious that by providing the plunger 128 with an enlarged end 130, which substantially fills the cylindrical portion of the bore of the bushing 131, with but little clearance, the slightest flow of gas through said bushing will effect the actuation of said indicating member 120 to withdraw the signal 121 from beneath the opaque region 93, into view of the operator.

In order to prevent the gas entering the mixing chamber from one inlet branch, effecting the actuation of the indicating member of the other inlet branch, a suitable baffle-plate 139 is provided, having a substantially vertical wall 140 extending into slots 141 and 142 in the respective walls 100 and 101 of the frame 95, by which it is supported, the upper portion 143 of said baffle-plate being preferably deflected in oblique relation to the wall 140 toward that side of the mixing chamber 52 in which the oxygen gas is admitted, the relatively angular portions of the baffle-plate 139 being effective to deflect and scatter the oxygen gas from its path, and to facilitate the mixing of said oxygen gas with the nitrous oxid gas, which is similarly deflected by the lower inclined end of the indicating member 107, as above described.

It may be observed that when no gas is flowing into the mixing chamber, the indicating members 107 and 120 will be shifted to their idle or normal position by gravity, as shown in full lines in Fig. 10, with their respective signal wings 112 and 121 disposed beneath the opaque region of the closure 86 of the mixing chamber out of view of the operator. However, the slightest flow of gas through either of the inlet branches 51 or 77 will instantly cause the indicating member of such branch to be rocked by the flow of gas into a position wherein the signal wings will be visible by the operator through the annular transparent portion surrounding the opaque region, so that he will be able to detect the flow of gas and likewise may detect any cessation of the flow of gas through either of the inlet branches.

The mixing chamber 52 is provided with the outlet 145, arranged to receive one end of the outlet tube 146, telescoped within said outlet 145 and having a collar 147 forming a stop for said outlet tube 146. Said tube 146 forms a T-connection with the dome 148 having the enlarged rim 149 for the engagement of the flexible gasometer 150, shown in Fig. 1, preferably formed of rubber and arranged to receive the surplus gas which is not taken by the patient during the alternate pulsations of respiration. In other words, the flexible gasometer 150 provides an auxiliary reservoir for containing the gas from which the patient may draw.

The outlet tube 146 is provided with a cleat 151, forming a hook or support upon which the flexible tube 152 may be supported when not in use. As shown in Figs. 1 and 5, said flexible tube 152 is connected at one end with the outlet tube 146 by the elbow 153, having one arm 154 in telescopic relation with the flexible tube 152, and the other arm 155 in telescopic relation with the outlet tube 146, said elbow being provided with a flange 156 forming a stop to engage the end of said outlet tube 146. The flexible tube 152 is arranged to connect the outlet tube 146 with any suitable inhaling device.

In some cases where profound anesthesia is desired, or where a more intense anesthetic is required, it is necessary to employ a liquid anesthetic, such as ether, chloroform, etc., and for this purpose we have devised mechanism for infusing into the anesthetic gas passing from the mixing chamber, ether or such anesthetic in a vaporized condition. Such mechanism may be conveniently substituted for the outlet tube 146, and as shown in Figs. 17, 18, 19 and 20, comprises a casing 160 having a tubular projection 161 engaged in telescopic relation with the outlet 145 of the mixing chamber 52, and provides a tang or projection 163 arranged to enter the slot 162 in the casing 53 of the mixing chamber 52, to maintain the casing 160 in upright position.

The casing 160 is provided at one side with a recess 165, formed by extending the wall 166 of the casing 160 inwardly, and said recess is provided with a closure 167, preferably formed of glass, and providing a chamber 164 in which the liquid anesthetic may be volatilized. The closure 167 is suitably cemented to the ring 168, which is in threaded engagement with the casing 160, as shown in Figs. 17 and 19, and is detachably connected with said casing in gas-tight relation by means of the gasket 169 interposed between said ring 168 and the seat 170 in the recess 165.

The tube 161 has an extension 172 extending transversely through the bore of the casing 160 and through the diaphragm 173, closing the lower portion of the opening 174 in the wall 166 of the recess 165, but leaving the aperture 175 for the passage of gas over said diaphragm 173 from the chamber 164 into the bore of the casing 160, as shown by the arrows.

The liquid anesthetic is conveniently contained in the reservoir 177, which is superimposed upon the casing 160 and provided with a closure 178 having the cleat or hook 179 for supporting the flexible tube 180 when not in use.

The liquid anesthetic is admitted from the reservoir 177 to the vaporizing chamber 164 through the passageway 181, which includes the valve seat 182 for the valve plug 183, whose stem 184 is in threaded engagement with the casing 160 and is provided with the knurled thumb-nut 185, by which it may be rotated to open and close the passageway 181, as best shown in Fig. 18.

The passageway 181 includes the tubular spout 186, arranged to direct the liquid anesthetic into the outer end of the vaporizing chamber, in which it may collect to any desired depth upon the lower cylindrical wall thereof.

The casing 160 is provided with the outlet tube 187, extending through the side wall thereof below the vaporizing chamber, and may be conveniently connected with the flexible tube 180 by the elbow having one arm 188 in telescopic relation with said tube 180, and the other arm 189 in telescopic relation with the outlet tube 187, as shown in Fig. 17.

The lower end of the casing 160 is enlarged to form a dome 190, having the enlarged rim 191 for the convenient engagement of the flexible gasometer 192, which is similar to the gasometer 150.

The mechanism thus far described may be employed to administer nitrous oxid and oxygen gas without the liquid anesthetic, the gas passing from the mixing chamber 52 through the tube 161 and its extension 172 and through the vaporizing chamber 164 and its aperture 175 into the bore of the casing 160, thence through the outlet tube 187 and the flexible tube 180 to any suitable inhaling device.

When it is desired to infuse the liquid anesthetic into the gas passing through the vaporizing mechanism, the vaporizer is employed, which, as best shown in Fig. 20 comprises a reticulated capillary cylinder formed of closely woven wire mesh 193, having its edges overlapped and connected by the rivets 194, and said wire mesh is provided with a stiffening ring 195 at one end and at the other end with a disk 196, which latter is provided with an eccentric opening from which a tubular projection 198 extends, and is arranged to be telescopically engaged within the tubular extension 172. Said tubular projection 198, as best shown in Fig. 20, is provided with a longitudinal slot 199, the walls of which are arranged to embrace the projection 200 on the inner surface of the tubular extension 172, as shown in Figs. 17 and 19, to insure that the lower portion of the reticulated cylinder will depend into adjacent relation with the bottom of the vaporizing chamber, and consequently into contact with the liquid anesthetic therein contained. Said liquid anesthetic is absorbed by capillary attraction of the woven mesh 193, and atomized by the gas passing therethrough, which gas carries the atomized liquid anesthetic in suspension from the vaporizing mechanism to such inhaling devices as may be employed.

From the foregoing description it will be seen that either one or two of either the nitrous oxid or oxygen cylinders may be employed and the gas selectively admitted to the mixing chamber 52, as desired, by means of the separate controlling valves operated by the hand-wheels 60 and 81, to admit the desired amount of either gas to the mixing chamber, which admission of the gas will be visibly indicated to the operator by the signals 112 and 121 respectively, said signals remaining visible so long as the gas is flowing, so that should any one of the cylinders become exhausted and the flow of gas cease, the signal for that particular gas will immediately return by gravity to its normal position and visibly indicate to the operator that said gas has ceased to flow, so that the operator may immediately replace the exhausted cylinder with one which is charged, and thereby prevent any possible danger of accident to the patient.

A modification of the means for turning the valve plug 79 and indicating the volume of gas admitted through the valve, is shown in Fig. 6, wherein the stem 201 is provided with the hand-wheel 202, having the set-screw 203 engaging the recess 204 in said stem. Beneath the hand-wheel 202 the collar 205 is provided for carrying the indicating pointer 206 over the dial-plate 83, said collar being secured to the valve stem 201 by the set-screw 208 extending into the groove 209, circumferentially disposed in said stem 201. It will be readily seen by this construction that while the hand-wheel 202 is rigidly secured to the stem 201, the collar carrying the indicator 206 may be rotatably adjusted about said stem.

The mechanism for reducing the pressure from the high pressure of the gas cylinders 19 and 20 to a pressure of about twenty-five pounds suitable for administering the gas to a patient, comprises the body 212 upon which is superimposed the valve casing 213 in threaded engagement therewith and having the valve seat 214, against which the valve plug 215, carried by the plunger 216, is forced by the lever 217. Said lever 217 is pivoted in the slotted removable block 218, arranged to rest upon a ledge or shoulder 219 and prevented from relative rotation by the pin 220 extending into the recess 222 in the body 212. Said removable block is arranged to be held in position by the nut 223, having the diametrical groove 224 arranged to be engaged by an ordinary screw-driver or similar device, by which said nut may be rotated into engagement with the block 218 to rigidly hold the latter in position. The lever 217 is arranged to be actuated to shift said valve plug 215 into engagement with its seat 214, by the pressure of gas in the body 212 against the diaphragm 227, which is inclosed in a removable diaphragm casing 228 and which is provided with the diaphragm stem 229 engaged with the free end of the lever 217 by the adjustable nut 230, which is in threaded engagement with the free end of said stem 229. Said diaphragm 227 is normally forced by the spring 231 in a direction tending to open the valve plug 215 from its seat.

The valve casing is provided with a series of flanges 235 surrounding the valve seat 214, for the purpose of absorbing heat from the surrounding atmosphere, whereby any tendency of the gas being reduced from high pressure, to freeze any moisture which may be carried thereby, is prevented by reason of such heat absorption. Said valve casing is provided with a chamber 233 adjacent to the valve seat, through which the gas from the cylinders 19 and 20 is arranged to pass, and in which a suitable filter is provided, said filter being preferably formed of absorbent material 236 interposed between disks 237 and 238 of reticulated material, such as wire mesh, to arrest any particles 239 carried by the gas, or to absorb any moisture held in suspension thereby.

In order to prevent the high pressure from being accidentally admitted through the valve into the body 212, and thereby injuring any part of the apparatus, the safety valve 240 is provided having the seat 241, against which the valve plug 242 is pressed by the spring 243 and adjusted by the cap 245 having the outlet apertures 246.

We do not desire to limit our invention to the precise details of construction and arrangement herein set forth, as it is obvious that various modifications may be made therein without departing from the essential features of our invention as defined in the appended claims.

Having thus described our invention, we claim:

1. In an anesthetic administering apparatus, the combination with a mixing chamber, of means for directing gases into said mixing chamber from separate sources of supply, and means within said mixing chamber serving as a mixing medium for indicating to the operator the flow of gas from each source of supply.

2. In an anesthetic administering apparatus, the combination with a mixing chamber, of means for directing gases into said mixing chamber from separate sources of supply, and means actuated by the discharge of said gases into the mixing chamber for indicating to the operator the flow of gas from each source of supply.

3. In an anesthetic administering apparatus, the combination with a mixing chamber, of means for removably supporting gas containers, means for directing gas from said containers to said mixing chamber, and means having relatively angular deflecting surfaces for separately indicating to the operator the flow of gas from each container, and for mixing said gases.

4. In an anesthetic administering apparatus, the combination with a mixing chamber, of means for directing gases into said mixing chamber from separate sources of supply, means between said sources of supply and said mixing chamber for reducing the pressure of said gases, and means having relatively inclined deflecting surfaces for indicating to the operator the flow of gas into said mixing chamber from each source of supply, and for mixing said gases.

5. In an anesthetic administering apparatus, the combination with a mixing chamber, of means for directing gases into said mixing chamber from separate sources of supply, means interposed between said sources of supply and said mixing chamber for reducing the pressure of said gases, means for indicating to the operator any flow of gas from each source of supply, and means for controlling the flow of gas into said mixing chamber, the indicating means tending to mix the gases as they enter said mixing chamber.

6. In an anesthetic administering apparatus, the combination with a mixing chamber having a transparent closure provided with a central opaque region, of means for directing gases into said mixing chamber from separate sources of supply, pivoted members mounted to rock within said chamber and arranged to be actuated by the flow of gas entering said chamber, and having each a signal wing normally underlying said opaque region, arranged to be shifted from beneath said opaque region when gas is flowing into said chamber, to indicate to the operator the presence of the gas therein.

7. In an anesthetic administering apparatus, the combination with a mixing chamber having an inlet and an outlet, of a transparent closure for said mixing chamber having an opaque region, and means pivoted in said chamber and having a signal normally disposed beneath said opaque region, and a portion overlying said inlet arranged to be rocked by the flow of gas through said inlet, to shift said signal from beneath said opaque region and thereby indicate to the operator the presence of the flow of gas.

8. In an anesthetic administering apparatus, the combination with a mixing chamber having an inlet and an outlet for anesthetizing gases, and an interior projection forming a stop, of a transparent closure for said mixing chamber having an opaque region, means movable within said mixing chamber carrying a signal disposed beneath said opaque region, and having a portion overlying said inlet and arranged to be shifted by the flow of gas through said inlet, to move said signal from beneath said opaque region into view of the operator, to indicate the presence of the flow of gas, the movement of said signal being limited by said stop.

9. In an anesthetic administering apparatus, the combination with a mixing chamber having an inlet and an outlet for anesthetizing gases, of a transparent closure for said mixing chamber, means pivoted in said mixing chamber for indicating to the operator the presence of the flow of gas through said inlet, and a plunger carried by said indicating means and extending into said inlet, arranged to be shifted therein by the flow of gas to actuate said indicating means.

10. In an anesthetic administering apparatus, the combination with a mixing chamber having an inlet and an outlet for anesthetizing gases, of a transparent closure for said mixing chamber having an opaque region, and indicating means movable in said mixing chamber, having a signal portion normally disposed beneath said opaque region, and having a plunger extended into said inlet and normally thrust therein by gravity, and arranged to be shifted by the flow of gas in said inlet, to move said signal from beneath said opaque region into view of the operator and thereby indicate the presence of the flow of gas through said inlet.

11. In an anesthetic administering apparatus, the combination with a mixing chamber having a tapered inlet and an outlet for anesthetizing gases, of a transparent closure for said mixing chamber having an opaque region, indicating means movable in said mixing chamber and having a signal portion normally disposed beneath said opaque region, and having a plunger extended into said inlet, normally thrust therein by gravity, and arranged to be shifted by the flow of gas in said inlet, to move said signal from beneath said opaque region into view of the operator and thereby indicate the presence of the flow of gas through said inlet, and means to limit the throw of said plunger.

12. In an anesthetic administering apparatus, the combination with a mixing chamber having inlet and outlet passageways for anesthetizing gases, of a transparent closure for said mixing chamber having an opaque region, forming a sight spot and indicating means in said chamber comprising independently movable signals normally disposed beneath said sight spot and movable into view of the operator by the flow of gas through the respective inlets.

13. In an anesthetic administering apparatus, the combination with a mixing chamber having inlet and outlet passageways for anesthetizing gases, of a transparent closure for said mixing chamber having an opaque region, indicating means in said chamber, comprising independently movable signals, normally disposed beneath said opaque region and movable into view of the operator by the flow of gas through the respective inlets, and a baffle-plate disposed between said signals.

14. In an anesthetic administering apparatus, the combination with a mixing chamber having inlet and outlet passageways for anesthetizing gases, of a transparent closure for said mixing chamber having an opaque region, indicating means in said chamber, comprising movable signals, normally disposed beneath said opaque region and movable into view of the operator by the flow of gas through the respective inlets, and a baffle-plate disposed between said signals and having its upper portion extended obliquely toward one of said signals.

15. In an anesthetic administering apparatus, the combination with a mixing chamber having inlet and outlet passageways, of a transparent closure for said mixing chamber, and signals arranged to indicate the flow of the respective gases into said mixing chamber, and normally maintained in an invisible position by gravity and in visible position by the flow of gases through the respective inlets.

16. In an anesthetic administering apparatus, the combination with a mixing chamber having inlet and outlet passageways, of a transparent closure for said mixing chamber, signals arranged to indicate the flow of the respective gases into said mixing chamber, and normally maintained in one position by gravity and in another position by the flow of gases through the respective inlets, and a baffle member disposed between said signals.

17. In an anesthetic administering apparatus, the combination with a mixing chamber having inlet and outlet passageways for anesthetizing gases, of a transparent closure for said mixing chamber having an opaque region, means for indicating the flow of the respective gases, comprising separate pivoted members having signal portions normally disposed beneath said opaque region and maintained in such position by gravity, said pivoted members having portions extended in the path of the flow of the gases discharged from the respective inlets, for shifting said signals from beneath said opaque region into view of the operator when the gas is flowing through said inlet passageways.

18. In an anesthetic administering apparatus, the combination with a mixing chamber having inlet and outlet passageways for anesthetizing gases, the inlet apertures being oppositely disposed, of a transparent closure for said mixing chamber having an opaque region, means for indicating the flow of gas into said mixing chamber, comprising a pivoted indicating member having a signal normally disposed beneath said opaque region and having a portion overlying one of said inlet passageways and arranged to be rocked against the action of gravity by the gas flowing through said passageway, to shift said signal portion from beneath said opaque region into view of the operator and an indicating member carrying a signal normally disposed beneath said opaque region and having a plunger pivoted thereto and extended into the other inlet and arranged to be shifted by the flow of gas through said inlet, to shift said signal against the action of gravity from beneath said opaque region into view of the operator.

19. In an anesthetic administering apparatus, the combination with a mixing chamber having inlet and outlet passageways for anesthetizing gases, the inlet apertures being oppositely disposed, of a transparent closure for said mixing chamber having an opaque region, means for indicating the flow of gas into said mixing chamber, comprising a pivoted indicating member having a signal normally disposed beneath said opaque region and having a portion overlying one of said inlet passageways and arranged to be rocked against the action of gravity by the gas flowing through said passageway, to shift said signal portion from beneath said opaque region into view of the operator, an indicating member carrying a signal normally disposed beneath said opaque region and having a plunger pivoted thereto and extended into the other inlet and arranged to be shifted by the flow of gas through said inlet, to shift said signal against the action of gravity from beneath said opaque region into view of the operator, and means disposed between said inlets for dividing the chamber into separate compartments.

20. In an anesthetic administering apparatus, the combination with a mixing chamber having inlet and outlet passageways for anesthetizing gases, and indicating mechanism in said mixing chamber and removable therefrom as a unitary structure, comprising a frame, signals pivoted to said frame for indicating the flow of gas into said chamber, and having a portion extended into the path of said gas to be actuated thereby.

21. In an anesthetic administering apparatus, the combination with a mixing chamber having inlet and outlet passageways for anesthetizing gases, indicating mechanism in said mixing chamber and removable therefrom as a unitary structure, comprising a frame, signals pivoted to said frame for indicating the flow of gas through said inlets, and having a portion extended into the path of said gas to be actuated thereby, and a separating member disposed between said signals for preventing the flow of gas through the passageway for actuating one signal, to accidentally effect the actuation of the other signal.

22. In an anesthetic administering apparatus, the combination with a mixing chamber having inlet and outlet passageways for anesthetizing gases, indicating mechanism having signals for indicating to the operator when the gas is flowing, and means separating said signals for deflecting the gases to afford a complete mixture of the different gases flowing into said mixing chamber from the respective inlets.

23. In an anesthetic administering apparatus, the combination with a mixing chamber having inlet and outlet passageways for anesthetizing gases, indicating mechanism comprising a pivoted member having a signal and a portion extending over one inlet, said portion having an obliquely extended end for deflecting the gas from its natural path, a pivoted indicating member associated with the other passageway and having a signal arranged to be actuated by the gas flowing through the last mentioned passageway, and a baffle-plate having an oblique portion for deflecting the gas from the last mentioned passageway out of its natural path, the deflecting action of the gases producing a complete mixture of the separate gases from the respective passageways.

In witness whereof, we have hereunto set our hands the 10th day of October, A. D. 1913, the 10th day of October, A. D. 1913, and the 9th day of October, A. D. 1913, respectively.

WILLIAM A. JOHNSTON.

Witnesses:
 Thomas C. Totten,
 Marian W. Cole.

ARTHUR W. BROWNE.

Witnesses:
 Robert C. Angell,
 Albert A. Sievers.

FREDERICK L. WALLACE.

Witnesses:
 William J. Russell,
 Clifton C. Hallowell.